US012440857B2

(12) United States Patent
Rhea et al.

(10) Patent No.: US 12,440,857 B2
(45) Date of Patent: Oct. 14, 2025

(54) PRESSURIZABLE FLUID CONTAINER APPARATUS

(71) Applicant: Lunatec, Inc., San Diego, CA (US)

(72) Inventors: Nick Rhea, San Diego, CA (US); Eric Young, La Mesa, CA (US)

(73) Assignee: Lunatec, Inc., San Diego, CA (US)

( * ) Notice: Subject to any disclaimer, the term of this patent is extended or adjusted under 35 U.S.C. 154(b) by 191 days.

(21) Appl. No.: 18/387,126

(22) Filed: Nov. 6, 2023

(65) Prior Publication Data

US 2024/0075485 A1 Mar. 7, 2024

Related U.S. Application Data

(63) Continuation-in-part of application No. 17/592,994, filed on Feb. 4, 2022, now abandoned, which is a continuation of application No. 17/128,337, filed on Dec. 21, 2020, now Pat. No. 11,267,006, which is a continuation of application No. 15/688,586, filed on Aug. 28, 2017, now Pat. No. 10,870,121, which is a continuation of application No. 14/332,304, filed on Jul. 15, 2014, now Pat. No. 9,744,545.

(51) Int. Cl.

| | |
|---|---|
| ***B05B 9/08*** | (2006.01) |
| *B05B 1/12* | (2006.01) |
| *B05B 11/10* | (2023.01) |
| *B65D 83/206* | (2025.01) |

(52) U.S. Cl.
CPC .......... *B05B 9/0827* (2013.01); *B05B 9/0816* (2013.01); *B05B 1/12* (2013.01); *B05B 11/1061* (2023.01); *B05B 11/1063* (2023.01); *B65D 83/206* (2013.01)

(58) Field of Classification Search
CPC ....... B05B 9/0827; B05B 9/0816; B05B 1/12; B05B 11/1061; B05B 11/1063; B05B 15/30; B05B 15/40; B05B 1/30; B05B 7/2418; B05B 7/2424; B05B 9/0822; B65D 83/206
See application file for complete search history.

(56) References Cited

U.S. PATENT DOCUMENTS

| | | | | | |
|---|---|---|---|---|---|
| 4,531,660 | A * | 7/1985 | Ford, Jr. | B05B 11/06 222/401 |
| 4,537,334 | A * | 8/1985 | Spengler | A47L 13/30 222/401 |
| 4,606,477 | A * | 8/1986 | Spengler | A47L 11/1625 222/401 |
| 9,744,545 | B2 * | 8/2017 | Rhea | B05B 9/0822 |
| 10,265,708 | B2 * | 4/2019 | Rhea | B05B 9/0816 |
| 10,870,121 | B2 * | 12/2020 | Rhea | B05B 9/0816 |
| 10,882,060 | B2 * | 1/2021 | Rhea | B05B 1/30 |
| 11,267,006 | B2 * | 3/2022 | Rhea | B05B 9/0827 |
| 2012/0091228 | A1 * | 4/2012 | Tseng | B05B 7/2467 239/311 |
| 2024/0075485 | A1 * | 3/2024 | Rhea | B05B 9/0816 |

FOREIGN PATENT DOCUMENTS

| | | | | |
|---|---|---|---|---|
| EP | 2308603 A1 * | 4/2011 | B05B 15/30 |
| EP | 2982444 A1 * | 2/2016 | B05B 7/267 |

* cited by examiner

*Primary Examiner* — Bob Zadeh

(57) ABSTRACT

A pressurizable fluid container apparatus, system and method of use.

4 Claims, 9 Drawing Sheets

PRESSURIZABLE FLUID CONTAINER APPARATUS

This is a continuation-in-part of U.S. patent application Ser. No. 17/592,994, filed on Feb. 4, 2022, which is a continuation of U.S. patent application Ser. No. 17/128,337, filed on Dec. 21, 2020, now U.S. Pat. No. 11,267,006, which is a continuation of U.S. patent application Ser. No. 15/688,586, filed on Aug. 28, 2017, now U.S. Pat. No. 10,870,121, which claims priority from U.S. patent application Ser. No. 14/332,304, filed Jul. 15, 2014. The entireties of all of which are incorporated herein by reference.

FIELD OF THE INVENTION

The present invention relates generally to the field of fluid containers, in which the bottle must be squeezed or tilted to release the flow of fluid to allow for ease of drinking, washing, and/or cleaning and is particularly applicable to sports bottles, or the like.

BACKGROUND OF THE INVENTION

In recent years, the number of health-conscious individuals has grown tremendously. In addition, research into the importance of clean water for hydration and other uses during health-improving activities: walking, hiking, biking, camping, and other outdoor activities has led to an increased need for fluid delivery devices that can provide fluids through a secure and hygienic means. Conventional fluid delivery devices, such as water bottles, are useful for various purposes in activities such as athletic, outdoor, recreational, or other uses. Typically, such devices are designed for a user to carry water, electrolytic fluid replacement drinks, or any type of liquid or, in some cases, powders or other materials. In many cases, these devices are used to enable active people: walkers, hikers, riders, and campers to drink or replenish fluid loss without stopping their particular activity. Additionally such devices may be used by these individuals as a source of water to clean themselves, their utensils and tools.

Depending on the type of fluid dispensing system, constant or frequent use of fluid containing devices and bottles can lead to damage to, for example, the pull-valve, or loss of a screw-type cap or pop-on/pop-off lid. Furthermore, for squeeze-type containers, the frequent deformation of the container can lead to structural failure of the walls of the container. Additionally, the ability to control water flow to clean or wash can be difficult as the fluid dispensing device must be tilted at a particular angle and/or squeezed to initiate the flow of water.

Additionally, transmission of germs and the inclusion of foreign material into the fluid becomes an increased risk from the constant and repetitive touching of the mouth to the pull-valve or rim and/or the repetitive opening of the container, exposing the contents to the environment.

Furthermore, the mechanical stress of repetitive opening and, in some cases, squeezing the bottle, may result in damaged or lost parts and a shortened product life span.

As a result of the above-stated problems and desires, there is a need for a fluid container, without the limitations of conventional fluid containers.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF INVENTION

The present invention comprises a pressurizable fluid container which may be further comprised of a body, a cap, a means for pressurizing the contents of the body and a dispensing mechanism, such as a spray nozzle.

In one or more embodiments, the pressurizable fluid container comprises a fluid containing body. The body may have chamfered or straight edges and may have a threaded portion to connect to a cap or lid. The threads may be interior or exterior to the body. The cap or lid may also have a threaded surface to screw on to the body. The threads may be interior or exterior to the cap.

In one or more embodiments, a plunger mechanism may be used to pressurize the contents of the body. The pressurization may be accomplished through a number of ways, for example, a plunger mechanism may consist of a handle, a shaft and a stopper. The plunger mechanism may be a vertical push-pull plunger. The plunger mechanism may be a horizontal push-pull plunger. The stopper may also be activated by a hinged or "squeeze-type" mechanism. In one or more embodiments, the contents may be pressurized by an external pump or a compressed gas canister.

In one embodiment, a vertical push-pull plunger is pushed repeatedly into and pulled repeatedly out of the body in order to pressurize the contents. Once pressurized, the contents may be released by activating a valve which allows the contents to travel up a relief tube and out the spray nozzle of the device.

In one or more embodiments, the valve may be used to open a fluid pathway to allow fluid in the body to escape. The valve may be a teeter valve which pivots on a transverse axis. When one side of the teeter valve is depressed, the fluid pathway to the nozzle is open. When the teeter valve is released, the fluid pathway is closed.

When the fluid pathway is open, the fluid may be directed to a nozzle. The nozzle may allow for adjustment of the release amount or other characteristics. In one embodiment, the nozzle may be a spray nozzle. The spray nozzle may be adjustable to allow for a fine mist, a stream of fluid, or a dispersed pattern to be released from the device.

The fluid pathway may be simply on-off or it may be controllable, as a variable flow.

In one embodiment of the present invention, the device may be used for hydration.

In one embodiment of the present invention, the device may be used for cleaning and washing.

In one embodiment of the present invention, the device may be used for applying a fluid or fluid-like substance to a surface or substrate.

In one embodiment of the present invention, an uptake adapter may be inserted between the relief tube and the relief tube extension to improve the outflow of liquid and increase the structural integrity of the relief tube extension.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Other objectives, features and advantages of the invention will become apparent from the following description and drawings wherein.

DETAILED DESCRIPTION OF THE PREFERRED EMBODIMENT

Various embodiments or examples may be implemented in numerous ways, including as a system, a process, or an apparatus. A detailed description of one or more examples is provided below along with the accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details.

For clarity, technical material that is known in the technical fields related to the examples has not been described in detail to avoid unnecessarily obscuring the description.

Figure 1:
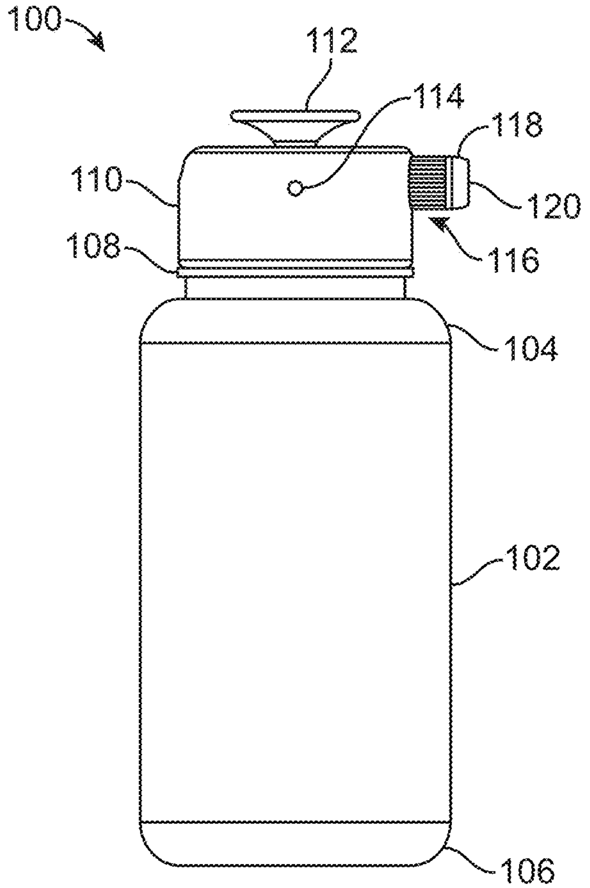
FIG. 1 is a side view of the preferred embodiment of the invention.

Referring now to FIG. 1, bottle assembly 100 includes body 102, it may include a top radius 104, a bottom radius 106, a thread lip 108, a cap body ("cap") 110, a pressurizing plunger ("plunger") 112, a teeter valve pivot 114, a nozzle base 116, an adjustable spray screw cap 118, and spray nozzle 120.

In one or more embodiments, body 102 may have a threaded portion (not pictured here) upon which the cap 110 may be screwed onto. Plunger 112 is disposed through the cap 110 and is used to pressurize the body 102. Adjustable spray screw cap 118 is threaded onto nozzle base 116. By turning the adjustable spray screw cap 118, the position of spray nozzle 120 is modified within nozzle base 116 thus changing the characteristics of the spray. The spray is activated by depressing a teeter valve (not pictured here) which pivots on an axis transverse through the diameter of the cap 110 located at the teeter valve pivot 114.

Figure 2:
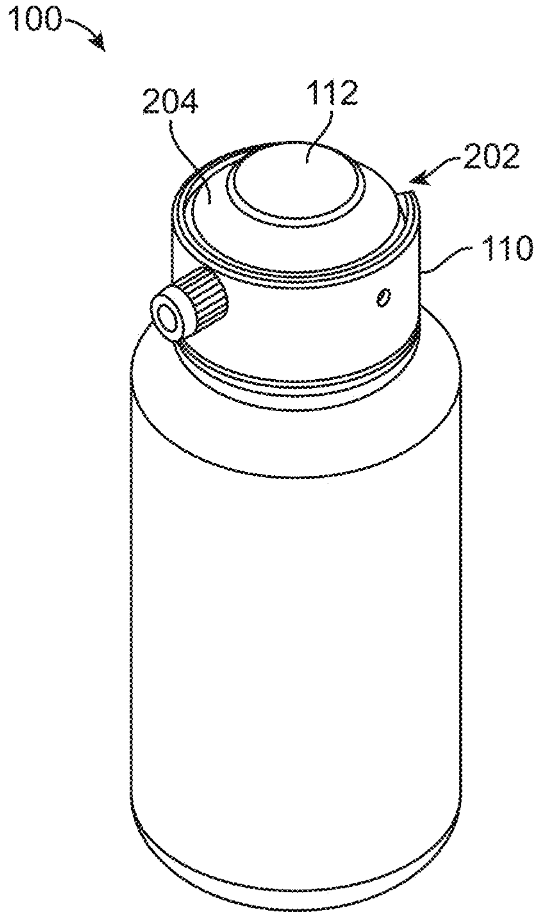
FIG. 2 is a perspective view of the top front of the preferred embodiment of the invention.

FIG. 2 depicts the assembled bottle assembly 100 and further depicts a cut-away portion 202 of the cap 110. The teeter valve 204 is shown located between the cap 110 and the plunger 112.

Figure 3:
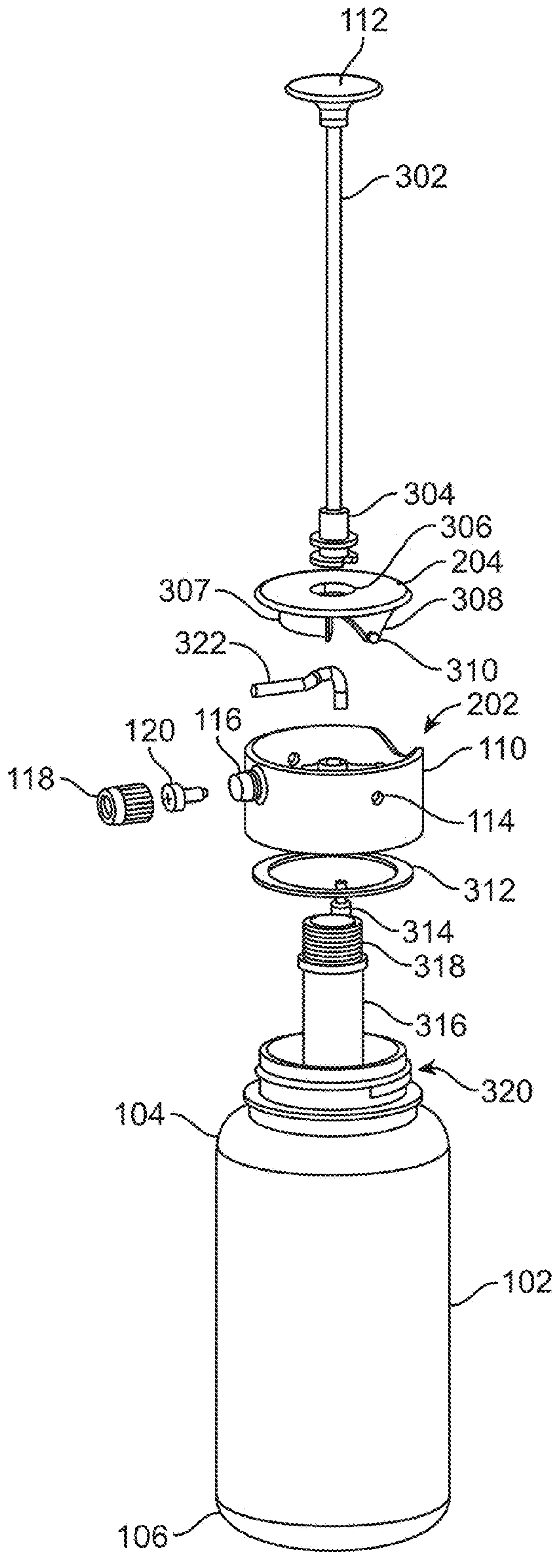
FIG. 3 is an exploded perspective view of the left side of the preferred embodiment of the invention.

Referring now to FIG. 3 which shows a exploded perspective view of the left side of the bottle assembly 100. Plunger shaft 302 has a top end which is connected to the plunger 112 and a bottom end which is connected to the stopper 304. The stopper 304 may contain at least one of a multiple of flanges to produce pressure within the body 102.

The plunger shaft is disposed through an opening 306 in the teeter valve 204. The teeter valve 204 pivots on an axis through the cap 110 and located at the teeter valve pivot 114. This pivot is accomplished by a teeter valve flange 308 projecting down on the underside of the teeter valve 204. A pivot tab 310 is located at the lower tip of the teeter valve flange 308. This pivot tab 310 extends partially into the teeter valve pivot 114 in the cap 110.

In one embodiment, the cap 110 is removably connected to the body 102 by a threaded portion 320 of the body and a mirror threaded portion (not pictured here) on the interior of the cap 110. To further seal this connection, a washer 312 is disposed between the body 102 and the cap 110.

The stopper 304 is disposed within the pump shaft 316. The pump shaft 316 has two ends, an upper end which has a threaded portion 318 and a lower end (not pictured here). The threaded portion 318 of the pump shaft 316 is rotatably attached to the underside of the cap 110.

A relief tube 314 has both a first ("upper") end and a second ("lower") end. Relief tube 314 allows the pressurized fluid to escape the body 102. In one embodiment, the upper end of relief tube 314 may be press-fit into the underside of the cap 110 utilizing an o-ring (not pictured) to form a seal.

A flexible conduit 322 has both a first ("upper") end and a second ("lower") end. The lower end of flexible conduit 322 is connected to the relief tube 314. Pressurized fluid which rises through the relief tube 314, passes through the cap 110 and then, in one or more embodiments, the upper end of relief tube 314 may be barbed to connect to the flexible conduit 322. The upper end of the flexible conduit 322 passes through nozzle base 116 and is attached to the spray nozzle 120. In one or more embodiments, the spray nozzle may 120 may be barbed, and flexible conduit 322 is press-fit over the barbs to form a connection. The pressurized fluid, having entered the nozzle base 116, then attains the desired spray characteristics determined by the positioning of the adjustable spray screw cap 118 and the spray nozzle 120.

Figure 4:
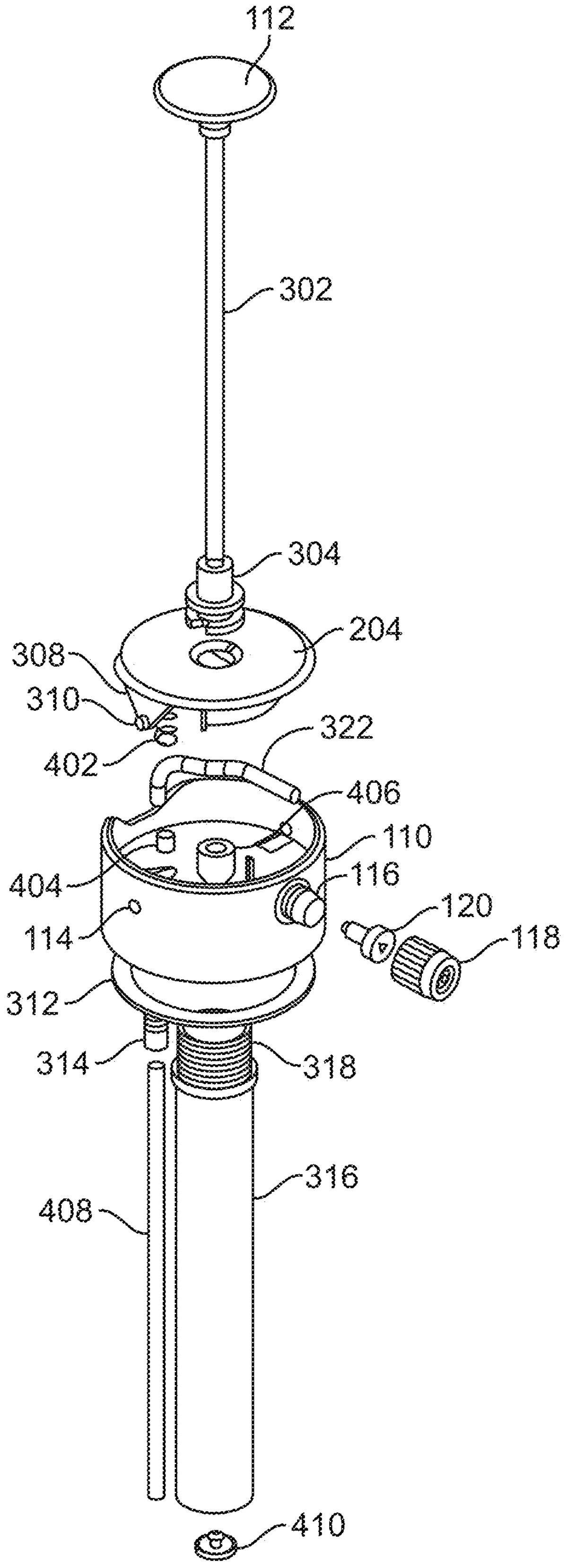
FIG. 4 is an exploded perspective view of the right side of the preferred embodiment of the invention.

Referring now to FIG. 4, a return spring 402, is disposed between the teeter valve 204 and the cap 110. When the teeter valve 204 is pressed to activate a spray discharge, return spring 402 is compressed and the teeter valve pivots on the pivot tab 310, located at the tip of the pivot flange 308. Return spring 402 is located on extrusion 404, on the interior top surface of cap 110.

The plunger shaft 302 is disposed within a shaft guide 406 and when depressed and air is conducted through the pump shaft 316 and into the body 102 through a pump valve 410, creates a pressure is created within body 102. A relief tube extension 408 is connected to relief tube 314, which in turn is connected to the underside of the cap 110. In one embodiment, the relief tube extension 408 may be press-fit into the relief tube 314. A through hole 606 (not pictured here) in the cap 110 then connects the flexible conduit 322 to the relief tube 314. This relief extension 408, relief tube 314 and flexible conduit 322 then conduct the pressurized fluid to the nozzle base 116.

Figure 5:
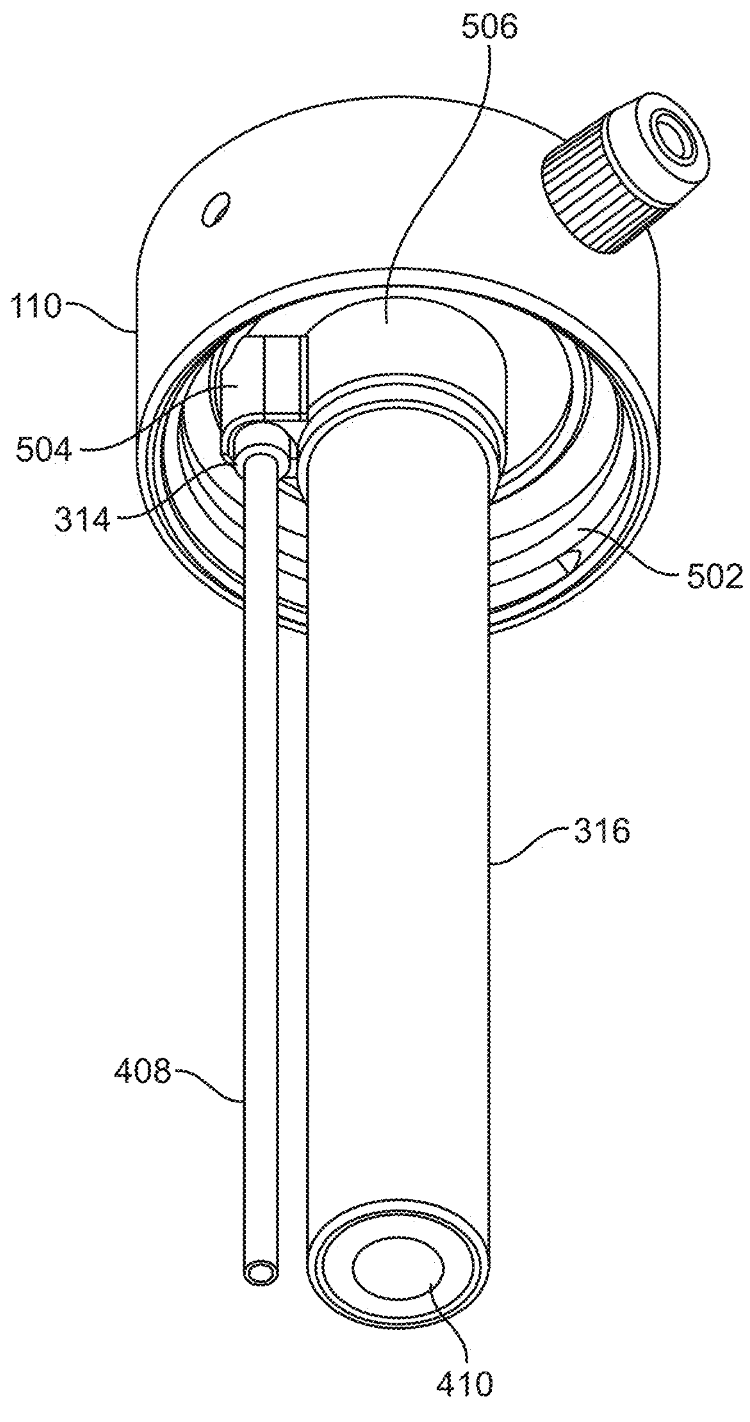
FIG. 5 is a perspective view of the underside of the lid assembly of the preferred embodiment of the invention.

FIG. 5 depicts the underside of the assembled pump and valve mechanism of one or more of the preferred embodiments. The interior threaded portion 502 of underside of the cap 110 is used to connect to and disconnect from the body 102 (not pictured here).

Housing 504 contains the through hole 606 (not pictured here) for the relief tube 314 and is disposed on the underside of the cap 110, as is the threaded connector 506 for the pump shaft 316.

Figure 6:
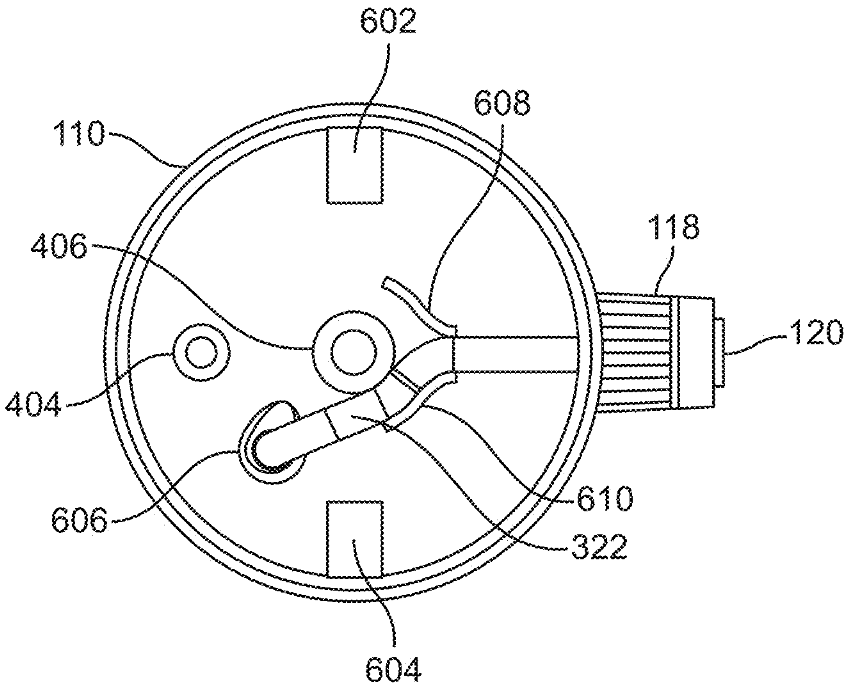
FIG. 6 is a top view of the interior of the lid of the preferred embodiment of the invention.

Referring now to FIG. 6, cap 110 is viewed from the top with teeter valve 204 and plunger 112 removed for clarity. Detents 602 and 604 allow clearance and free movement for pivot flanges 308 on interior surface of cap 110.

A through hole 606 provides a connection point for the lower end of flexible conduit 322. Flexible conduit 322 is then routed across the upper interior surface of cap 110 by guides 608 and 610. The upper end of flexible conduit 322 is then connected to the barbed nozzle base 116 (not pictured here).

Figure 7:
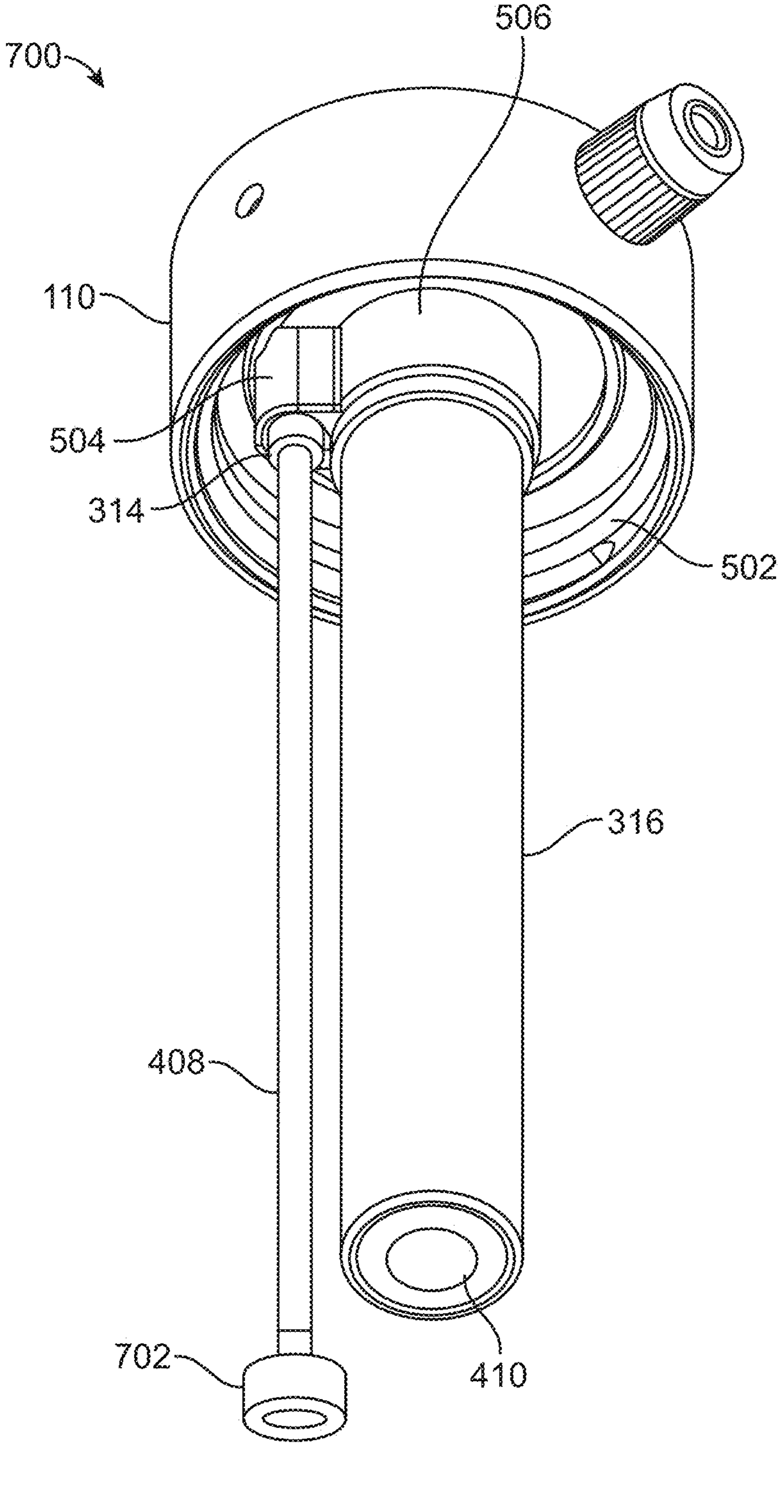
FIG. 7 is a perspective view of the underside of the lid assembly of the preferred embodiment of the invention.

Referring now to FIG. 7, the cap insert assembly 700 comprises the interior threaded portion 502 of underside of the cap 110 which is used to connect to and disconnect from the body 102 (not pictured here). Housing 504 contains the through hole 606 (not pictured here) for the relief tube 314 and is disposed on the underside of the cap 110, as is the threaded connector 506 for the pump shaft 316. Filter assembly 702 is removably attached to the relief tube extension 408.

Figure 8:
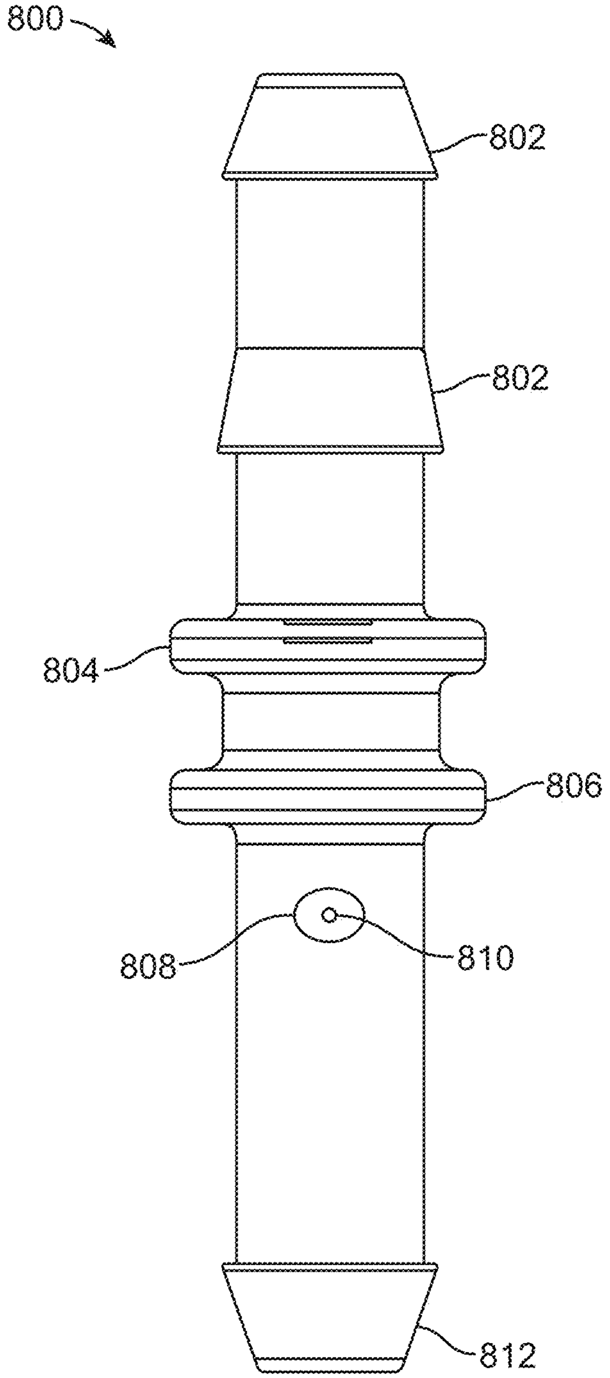
FIG. 8 is a side view of the uptake adapter assembly of the preferred embodiment of the invention.
Figure 9B:
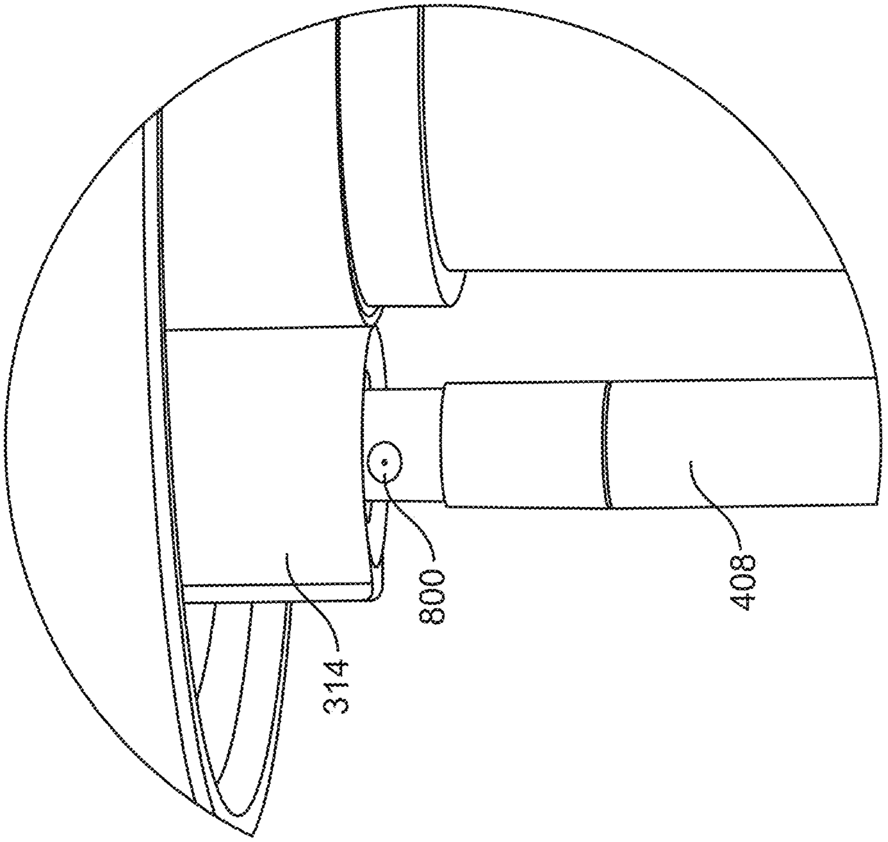
FIG. 9*b* is a close-up perspective view of the positioning of the uptake adapter assembly of the preferred embodiment of the invention.

Referring now to FIG. 8, uptake adapter assembly 800 is comprised of a first end and a second end. Upper flanges 802 are disposed at the first end of the uptake adapter 800 and inserted into relief tube 314 (not pictured). A first hose seat 804 and a second hose seat 806 are positioned adjacent to each other. An intake indention 808 is positioned adjacent to the second hose seat 806. An intake hole 810 (or aspirator hole) is centered within the intake indention 808. The importance of the configuration of having intake hole 810 centered within an intake indentation will be apparent from the further description below. Lower flange 812 is disposed at the second end of the uptake adapter 800 and inserted into the lumen of relief tube extension 408 as shown in FIG. 9*b*. Relief tube extension 408 can be slidingly adjusted up and over the lower flange 812 all the way up to second hose seat 806. How far up the second end of the uptake adapter relief tube extension 408 is positioned by sliding it upwards or downwards depends on the user and how the user wants the bottle assembly 100 to perform and the type spray the user wants being released from the bottle. When intake or aspirator hole 810 is exposed then compressed air is allowed to pass through intake or aspirator hole 810 and mix with the water. This results in water being released in pulses because of the compressed air. As a result, the spray has more force and uses less water. The amount of exposure of intake or aspirator hole 810 has to the compressed air determines the amount of compressed air that is mixed in with the water. The more air, the more force in the spray, and the less air, the less force in the spray. The amount of exposure of intake or aspirator hole 810 is determined by how much of intake indentation 808 is covered by the wall of relief tube extension 408. If relief tube extension 408 is slid over the entirety of intake indentation 808, then no air will be allowed to pass through intake or aspirator hole 810 to be mixed with the water, and the spray from the bottle will be a steady stream of water. This will also conserve pressure, because none of the energy stored from the compressed air will be released. If relief tube extension 408 is slid partially over intake indentation 808, then some air will be allowed to pass through intake or aspiratory hole 810 to mix with the water, but not the maximum amount of air, and the result will be a spray of water that is more powerful and is mixed with air. If relief tube extension 408 is not slid over any part of intake indentation 808, then the maximum amount of air will be allowed to pass through intake or aspiratory hole 810 to mix with the water. In this way, the user can control the type of spray that is released. So relief tube extension 408 can cover all or part of intake indentation 808 to dial in the amount of air being released. In yet another embodiment, not shown, intake or aspirator hole 810 can be formed in the shape of a slit, rather than a hole. A slit results in the regulation of the amount of air being allowed to mix with the water. If intake or aspirator hole 810 is in the shape of a slit instead of a hole, then intake indentation 808 is not needed. Thus, in one embodiment, intake or aspirator hole 810 is in the shape of a slit, and is not disposed within an indentation. In another embodiment, intake or aspirator hole 810 is in the shape of a slit, and is further disposed within intake indentation 808.

Figure 9A:
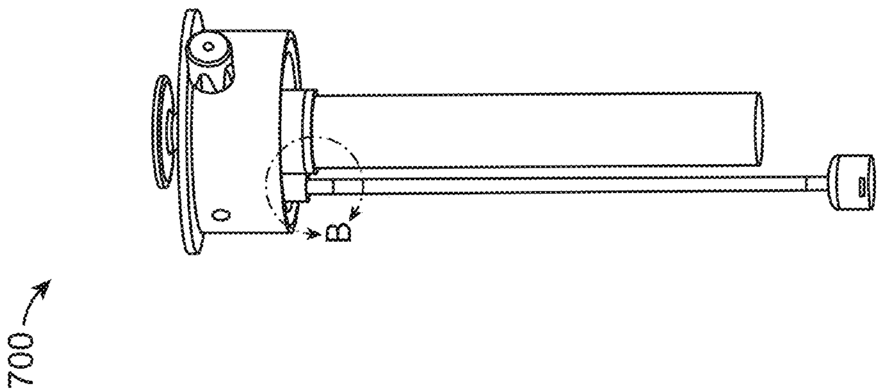
FIG. 9*a* is a perspective view of the underside of the lid assembly of the preferred embodiment of the invention.

Referring now to FIG. 9*a*, cap insert assembly 700 is shown as an isometric view with a detailed inset.

Referring now to FIG. 9*b*, the detailed inset of FIG. 9*a* illustrates the positioning of the uptake adapter assembly 800 between the relief tube 314 and the relief tube extension 408.

We claim:

1. A bottle cap assembly comprising:

a cap comprising;

a top surface and a bottom surface, a shaft guide, and a relief housing on the bottom surface of the cap; and a plunger disposed through the shaft guide;

a conduit, wherein one end of the conduit is in fluid communication with the relief housing;

an uptake adapter with a top end fitted into the relief housing and a bottom end, the uptake adapter having an intake hole disposed within an indentation; and a relief tube extension with a top end and a bottom end, the top end being fitted over the bottom end of the uptake adapter, wherein the relief tube extension can be moved by sliding it up or down along the uptake adapter and can cover all or part of the indentation, thereby determining how much air is allowed to pass through the intake hole.

2. The bottle cap assembly of claim 1, wherein the intake hole is round in shape.

3. The bottle cap assembly of claim 1, wherein the intake hole is in the form of a slit.

4. The bottle cap assembly of claim 1, wherein a filter assembly is attached to the bottom end of the relief tube extension.

* * * * *